United States Patent
Blaser et al.

(10) Patent No.: US 7,519,963 B1
(45) Date of Patent: Apr. 14, 2009

(54) LAYERED COMPUTING SYSTEMS AND METHODS WITH LOCATION EXCLUSIONS

(75) Inventors: Jared Ricks Blaser, Orem, UT (US); Randall Richards Cook, Springville, UT (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 11/614,826

(22) Filed: Dec. 21, 2006

Related U.S. Application Data

(63) Continuation of application No. 10/459,870, filed on Jun. 11, 2003, now Pat. No. 7,165,260.

(60) Provisional application No. 60/387,969, filed on Jun. 12, 2002.

(51) Int. Cl.
*G06F 9/445* (2006.01)

(52) U.S. Cl. .................. 717/174; 707/203; 713/165; 717/168

(58) Field of Classification Search ............. 707/203; 717/168–170, 174–176; 719/310; 726/4, 726/17, 21; 713/164–167
See application file for complete search history.

(56) References Cited

U.S. PATENT DOCUMENTS

| 5,361,356 | A | * | 11/1994 | Clark et al. ............... 711/206 |
| 5,680,609 | A | * | 10/1997 | Reinhardt ................. 707/10 |
| 5,752,005 | A | * | 5/1998 | Jones ....................... 703/22 |
| 5,771,381 | A | * | 6/1998 | Jones et al. ............... 713/100 |
| 5,931,935 | A | * | 8/1999 | Cabrera et al. ............ 710/260 |
| 6,026,402 | A | * | 2/2000 | Vossen et al. .............. 707/9 |
| 6,128,730 | A | * | 10/2000 | Levine ..................... 713/1 |
| 6,618,735 | B1 | * | 9/2003 | Krishnaswami et al. ..... 707/203 |
| 6,651,171 | B1 | * | 11/2003 | England et al. ........... 713/193 |
| 6,716,102 | B2 | * | 4/2004 | Whitten et al. ............ 463/43 |
| 6,941,470 | B1 | * | 9/2005 | Jooste ..................... 726/4 |
| 7,028,305 | B2 | * | 4/2006 | Schaefer .................. 719/310 |
| 2002/0065776 | A1 | * | 5/2002 | Calder et al. ............ 705/51 |
| 2002/0143764 | A1 | * | 10/2002 | Martin et al. ............ 707/8 |

* cited by examiner

*Primary Examiner*—Lewis A Bullock, Jr.
*Assistant Examiner*—Jue S Wang
(74) *Attorney, Agent, or Firm*—Advantedge Law Group

(57) ABSTRACT

The inventions relate generally to computer systems having facilities for providing virtual portions of file systems and configuration settings to applications. More particularly, the inventions relate to computer systems that provide a layer organization for files and configuration settings that can be overlaid on top of an operating system. Detailed information on various example embodiments of the inventions are provided in the Detailed Description below, and the inventions are defined by the appended claims.

18 Claims, 5 Drawing Sheets

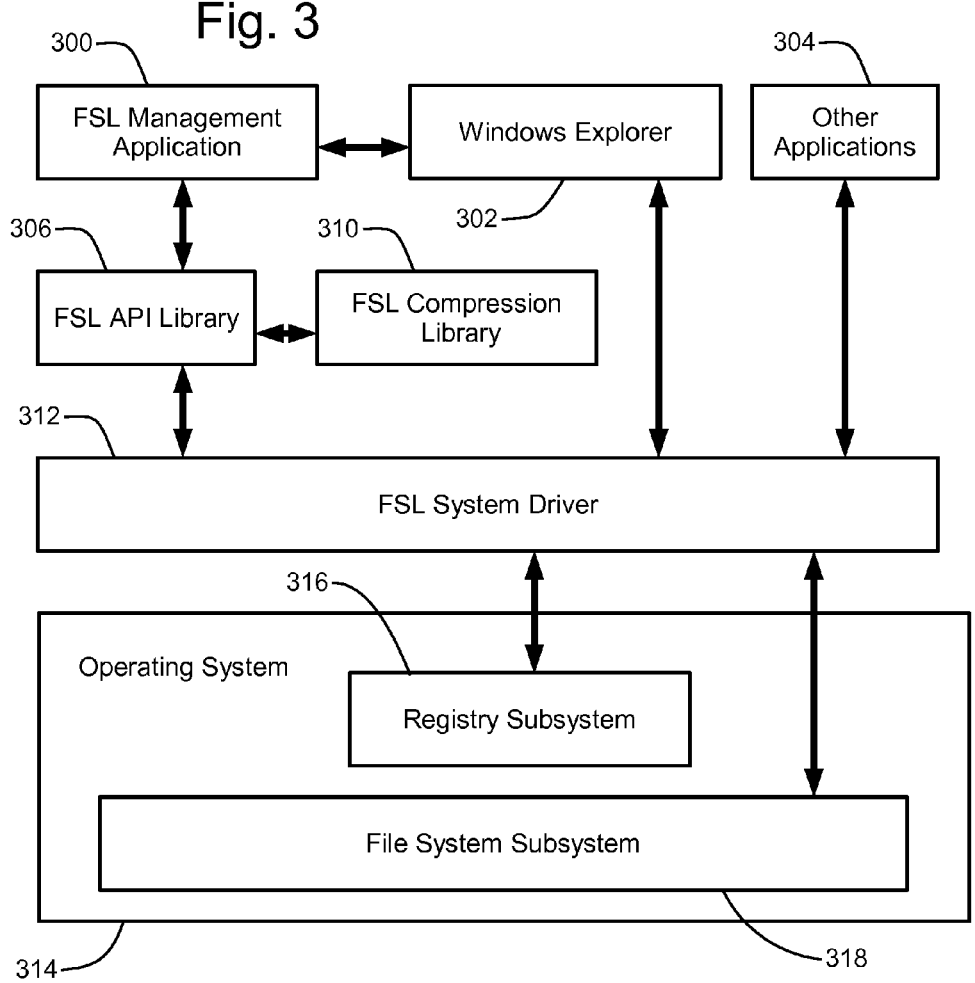
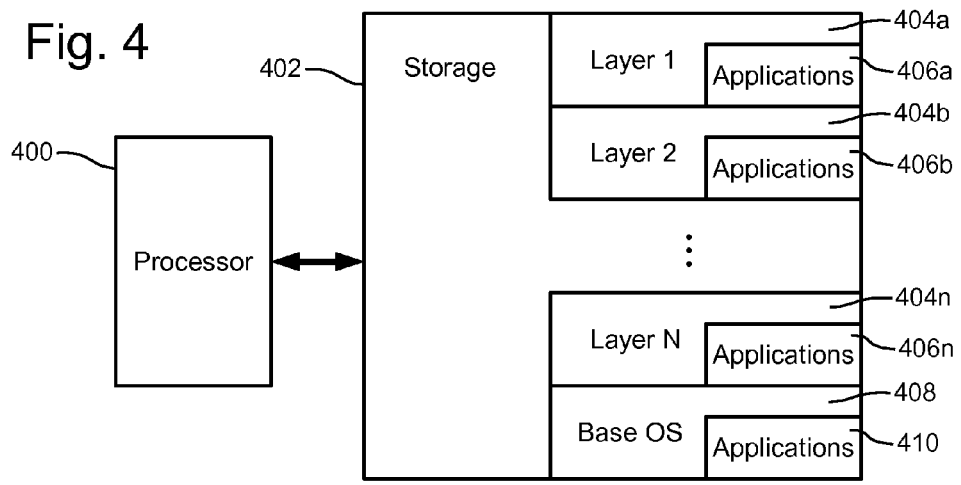

LAYERED COMPUTING SYSTEMS AND METHODS WITH LOCATION EXCLUSIONS

CROSS-REFERENCE TO RELATED APPLICATIONS

This application is a continuation of U.S. patent application Ser. No. 10/459,870 filed Jun. 11, 2003, now U.S. Pat. No. 7,165,260 which claims the benefit of U.S. Provisional Application No. 60/387,969 filed Jun. 12, 2002, both of which are hereby incorporated by reference in their entirety.

BACKGROUND OF THE INVENTIONS

Prior computing systems have been susceptible to application conflicts with the host operating system (OS) and other applications. When an application is installed to an OS, a number of globally accessible files are often placed to the computing system, including for example shared libraries and system configuration. Those shared libraries are often provided in different versions, with applications requiring one version or another. A mismatch between a library version and a version required by an application sometimes results in that application crashing, becoming inoperable, or exhibiting other errors. Shared configuration elements are sometimes globally available to applications, which may write a favored configuration thereto. Following a write to that configuration other applications may be unable to read the configuration properly, or may be unable to function under a new specified configuration. Thus it is that following the installation of an application to a computer, other applications may stop working.

Installing a number of applications to a computer can be something of a black art. An administrator may, with good intentions and understanding, install several applications to a computer. Upon testing an installation or during use, the administrator or a user may discover that one or more applications operate errantly or not at all. It is usually not apparent which applications are in conflict. The administrator may enter a procedure in which applications are uninstalled from the computer in a process of elimination to find the offending applications. Sometimes de-installation programs do not remove all installed files, in which that procedure may fail to locate the problem. The administrator is then required to continue by creating a clean (or virgin) installation, and installing applications one at a time until the problem is located.

When applications are found to conflict, a choice must usually be made as to which one will be installed. One of the applications is sometimes installed to a different computer to avoid the conflict. If conflicting applications must be installed to a single computer, a new version of at least one of the applications must be sought and purchased from the software vendors. A non-conflicting version may not be available, especially if a vendor is small, not supporting the application, or no longer in business.

Snapshot utilities are available, which generally operate to create a database of all files and registry settings on a computer. Prior to installing an application, a snapshot is taken of the files and registry settings. The application is then installed, and tested. If the application fails to work satisfactorily, the system can be restored by comparing the existing files and registry settings against the snapshot and removing installed files and otherwise restoring the system as before. Snapshot utilities have several limitations. First, if a newly installed application causes a prior installed application to fail, it is often not possible to simply revert to a snapshot made prior to older application installation, especially if there have been other applications installed in the interim. The administrator may be required to revert back to the earlier snapshot, and then re-install the intervening applications and the new application. Additionally, there are usually a limited number of snapshots that can be stored, and thus a required snapshot may not have been retained when found to be needed.

Likewise, a system may be restored to an earlier state if backups have been made. That restoration process, however, usually involves a significant amount of time and destroys all data recorded to the system after the time of the backup.

Another method involves recording a series of changes (or "diffs") to a buffer. Using that method a system can be restored back to a point in time by reverse application of the diffs to the file system back to the selected point in time. That method typically requires a fixed amount of disk space for the diff buffer, which becomes unavailable for regular use. As the buffer becomes full, the only way to continue to record diffs is to overwrite older diffs. Because of this limitation, the method can only restore a system back to a date for which diffs remain available. In addition, this method requires three disk operations per write request: one to read the existing disk information, one two write the diff, and one to write the original request. This method is therefore processor and disk intensive.

The Microsoft Windows ME™ OS includes a feature called "System Restore". That system is essentially a snapshot system, and only backs up files related to the OS and installed applications (not user files).

A current practice of maintaining computers is to image the hard drive of a computer while in a working state. If the computer becomes unstable, or if undesirable content appears on the computer, the computer's drive is restored using the earlier made image. This practice is lacking in that all changes made following the image creation are wiped off the system when the computer is restored, including user files and other applications.

Also, some applications are not provided with an uninstall program. To de-install those applications an administrator is required to know where the application files and settings reside in the system, and remove them manually.

It is therefore apparent that much time and money is expended in the administration of applications on computing platforms, and thus there is a need for a way to ease the installation and de-installation of applications, and prevent application conflicts.

BRIEF SUMMARY OF THE INVENTIONS

The inventions relate generally to computer systems having facilities for providing virtual portions of file systems and configuration settings to applications. More particularly, the inventions relate to computer systems that provide a layer organization for files and configuration settings that can be overlaid on top of an operating system. Detailed information on various example embodiments of the inventions are provided in the Detailed Description below, and the inventions are defined by the appended claims.

BRIEF DESCRIPTION OF THE DRAWINGS

FIG. 3 illustrates components of a particular layering computer system.

FIG. 4 illustrates components of a layering computer system at simple organizational level.

Figure 1:
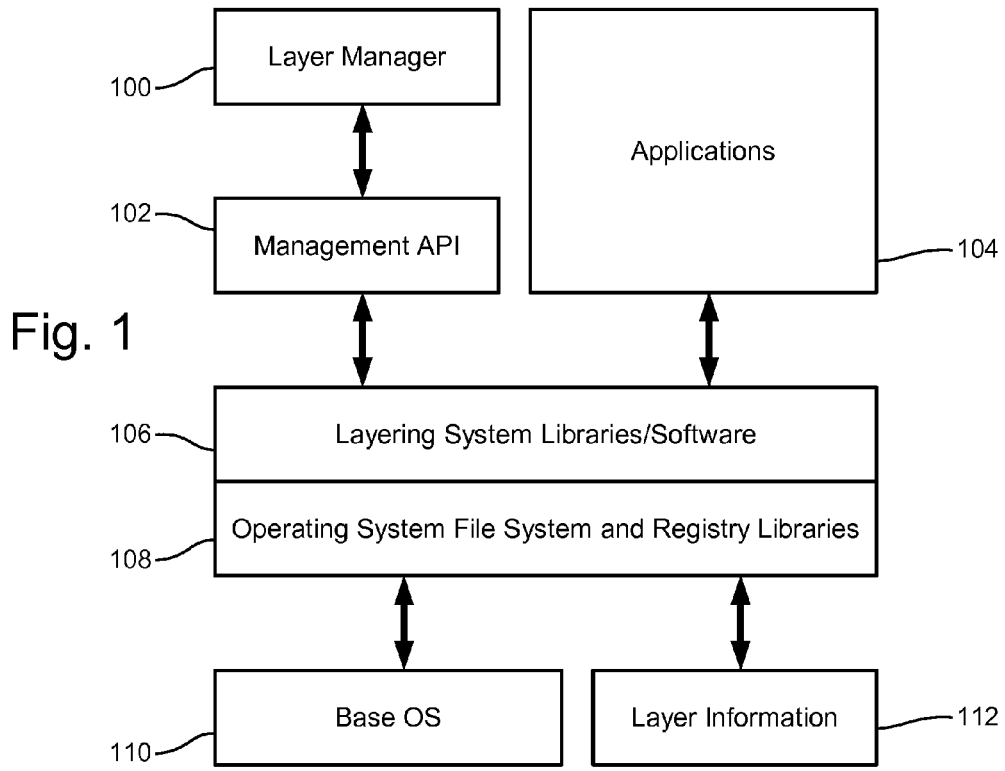
FIG. 1 illustrates components of a layering computer system at a conceptual level.

Reference will now be made in detail to some embodiments of the inventions, example of which are illustrated in the accompanying drawings.

DETAILED DESCRIPTION

General Concepts

For the purpose of simplifying the discussion herein, an example computing device may be referenced. That device is a conventional personal computer or workstation having a CPU, memory, display, keyboard, mouse, and at least one fixed disk. It will be apparent to one of ordinary skill in the art that the concepts disclosed herein may apply equally to other computing systems that are not personal computers, for example diskless workstations, headless workstations or servers, and embedded systems. Herein it is contemplated that the inventions may be applied to these and other computing systems, both existing and yet to be, using the methods and principles disclosed herein.

Likewise the discussion below speaks of Registries and registry settings, which are specific to Microsoft Windows™ operating systems. It will be recognized that registry settings are merely configuration for the operating system and applications installed to a computing device, accessible through a system-wide API. The meaning of registries and registry settings is therefore extended to future Windows operating systems and operating systems other than Windows, where equivalent structures and access facilities exist thereon.

In the discussion below, the words "enabled" and "activated" are used interchangeably to describe layers that are active or enabled on a layering computing system. Likewise, the words "disabled" and "deactivated" may be used to describe layers that are not enabled or active.

Provided in one aspect of the invention are application layers which are isolated from other applications on a computer. In that aspect, an application layer may be defined to be a group of files in combination with any associated application configuration stored to operating system files. An application of a layered system may be an application in the most commonly used meaning, such as word processors, browsers, system tools, games, and the like, or may extend to other software installed to a host providing an environment, such as a graphical user environment or shell. It will be seen that isolating application files and configuration in a layer provides several benefits, including the ability to delete, disable, and enable applications in a simple way and to provide a barrier between applications which may use conflicting configuration or library files. The use of a layering system may therefore enhance the stability, reliability, usability and security of a computing system.

A layered system introduces a new concept of organizing data from disparate sources and presenting a virtual view of that data to an operating system and a user. This permits the real data to be much more logically organized while still presenting to the operating system and the user an expected view and access of that data. In a sense, a layer is a higher order storage unit. Because a layer can be managed as a unit for the purposes of exporting, importing, enabling, disabling, and so on, a computer system and user data can be managed with a greater degree of flexibility and reliability, also with improved security. As changes to a layered system are made, the changes are organized while being written, rather than tracking the changes made. By doing this both a speed penalty and the dedication of large amounts of storage for images and changes are avoided.

Depicted in FIG. 1 are components of a layering computer system at a conceptual level. A base operating system 110 forms a platform with which applications can be run and files can be accessed in file systems. Base operating system 110 further has registry settings, globally available to applications for reading and writing. The system has libraries 108 for executing the functions of the operating system including operating file systems and registries, and other operating system functions. Tied into libraries 108 are layering system libraries and/or software 106 which intercept file system and registry accesses from applications 104. As accesses are received from applications 104, the layering system software 106 performs computations to determine whether the accesses should be permitted to continue to the base operating system 110, or should be redirected to layer information 112, the information relating to and the contents of files and registry settings. A layer manager application 100 may be provided to permit control and configuration of the layering system software 106 through a management API and library 102.

Figure 2:
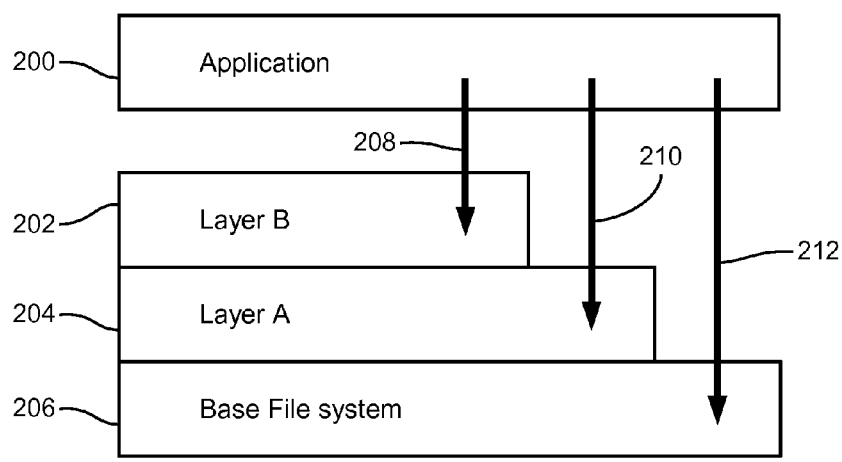
FIG. 2 illustrates an operation of a layering computer system at a conceptual level.

Depicted in FIG. 2 is the operation of a layering computer system at a conceptual level. An application 200 is running on a layered computing system. This computing system contains a base file system 206, and two layers labeled "A" and "B", 204 and 202 respectively. In this example layer B has priority over layer A, which in turn has priority over the base file system. A first file access 208 is made by application 200. The layered computing system determines the owner of the file being accessed. Finding an entry for file access 208 in layer B, the corresponding file in layer B is opened and returned to the application. The file access of 208 might also correspond to files in layers A or the base file system, however layer B is determined to be the owner as it has priority over layer A and the base. Another file access 210 is made by application 200. The computing system does not, however, find a corresponding entry in layer B. An entry is found in layer A, which has priority over the base file system. Again, if a file existed in the base file system corresponding to the file access, it would be accessed because layer A is found to be the owner with priority. The computing system is not able to find corresponding entries in layers A or B for file access 212, so that access is made to the base file system.

In FIG. 4 components of a layering computer system at simple organizational level are shown. A computing device includes a processor 400, which may also have peripheral devices attached such as memory, input devices or output devices as desired. Processor 400 interacts with one or more storage devices 402, providing storage for the processor. On storage 402 is a base operating system 408 and applications 410. A number of layers 404a-n are also contained on storage 402, each having applications 406a-n.

In larger aspects, a layer may be defined to be a set of file system and registry changes, that combination forming an organizational unit that may be managed by layered system software. In some cases, a layer need not contain registry changes, but only changes to one or more file systems. In those cases it may be desirable to limit support in the layered system software to files of file systems. A layer definition may include layer properties and settings, layer inclusive files, references to those files, registry settings and locations, and a manifest or directory those file and registry references.

References may be made inherent, if desired, by locating files and registry settings in a structure that mirrors a real underlying file system. Such a mirroring system may be organized in a common directory, with one subdirectory per defined layer, each containing a mirrored directory structure of the underlying file system.

An exported layer will contain all of the layer-included information bundled in a transportable archive. Exported layers may be further bundled into groups, which is especially useful for layers that rely on other layers, such as layers of a hierarchy or peer layers. For systems that utilize a mirror structure of an underlying file system, it may be desirable to hide the mirror structure from applications, except perhaps a manager application, so as to prevent accidental data modification, loss, or meddling.

A layer intending to isolate an application has stored thereon the files and directory structure of the application's installation. When that layer becomes mounted (or enabled), those application files and directories are shadowed or overlaid over the regular operating system file system. Shared libraries (such as DLLs), system accessible configuration (such as registry entries), and version control are managed by the layering subsystem, optionally using an internal database. Though each layer is a separate and individual entity within the host OS, the application files, data, and system accessible configuration are presented as if they resided in their respective ordinary locations. Thus an application stored in a layer appears to the host OS as if it were installed in the ordinary fashion with the expected functionality.

For example, suppose a layer existed in a Windows OS environment that specified that in C:\windows there should be a file called winfile.exe. Suppose that this file did not reside in the real C:\windows directory. When the layer is not active, a file listing of C:\windows does not show a winfile.exe. When the layer becomes active, the layering system merges (or overlays) the real listing of C:\windows and the file list described in the layer. In this example, applications (and thereby a user) would see all of the files in the real C:\windows directory and winfile.exe. Registry values in a layer may be handled in a similar manner.

Figure 5:
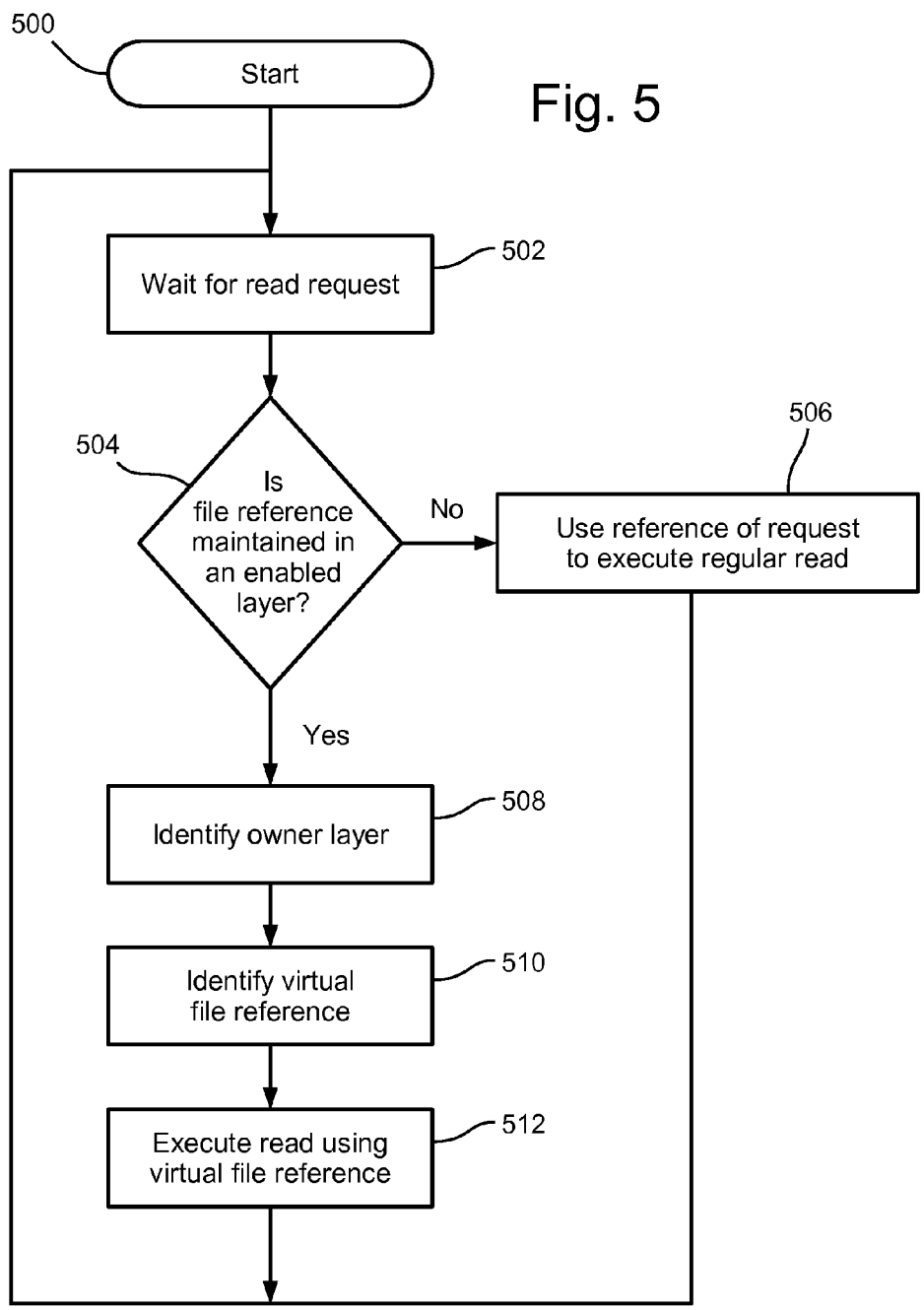
FIG. 5 shows a simplified method for performing read file system operations using a layered computing system.

Shown in FIG. 5 is a simple method for performing read file system operations using a layered computing system. A loop is entered beginning at step 500. Execution halts in step 502 pending the receipt of a read request. A determination is then made in step 504 as to whether or not the file reference of the request is maintained in an enabled layer. To perform that determination all the layers on the system are generally examined for a virtual file corresponding to the file reference of the request. If no enabled layer contains such a virtual file, step 506 executes in which the usual read operation is executed using the file reference of the request. Otherwise, an owner layer is identified in step 508. For example, if two enabled layers contain a virtual reference to a file, one will take priority over the other and be identified as the owner layer. Step 510 then executes, in which a virtual file reference is determined that corresponds to the file reference of the read request. That virtual file reference might be an offset and length for a storage device in some systems, a pathname at a mirrored location in other systems, or other reference. Afterward, the read operation is executed using that virtual file reference in step 512.

Figure 6:
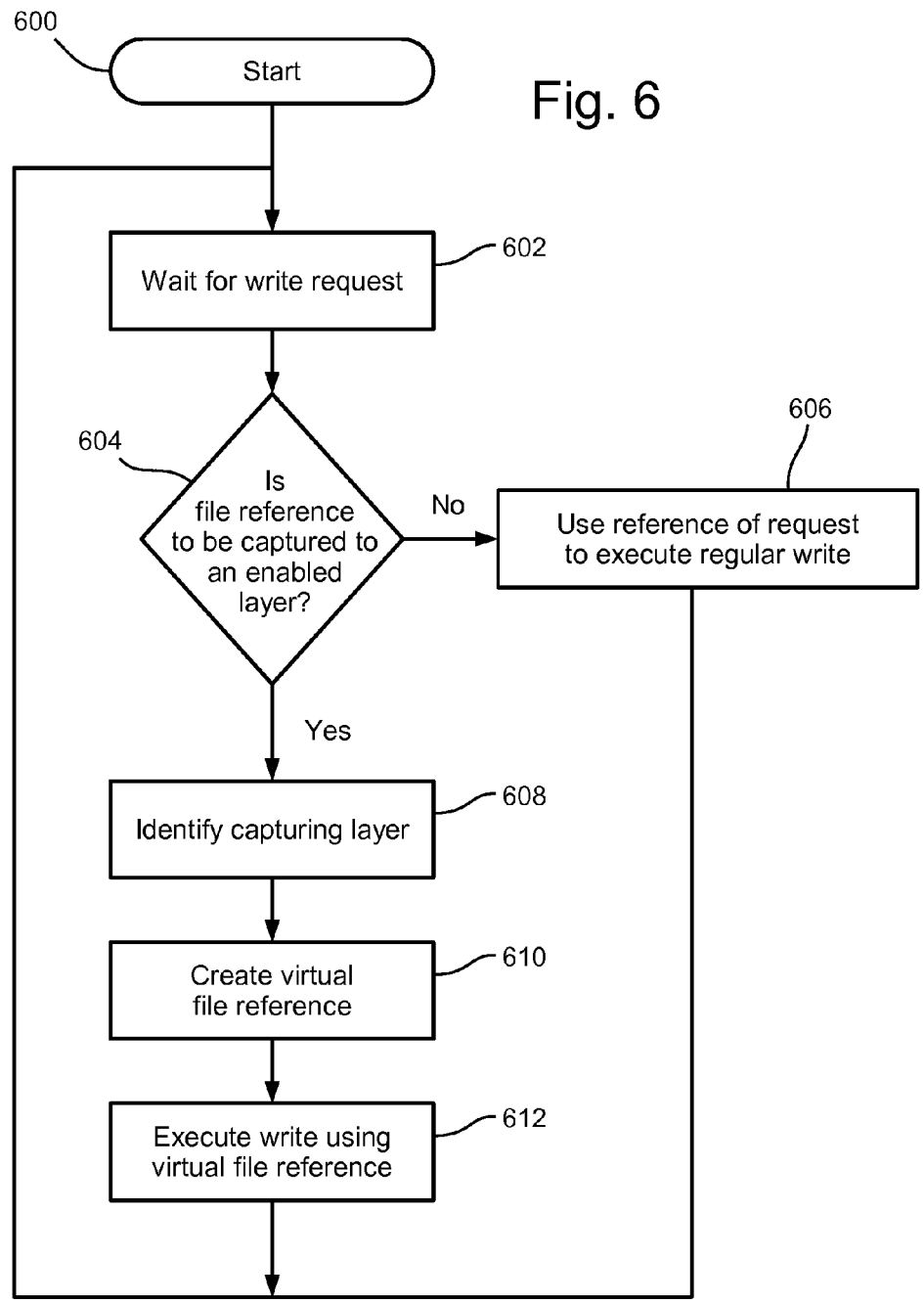
FIG. 6 shows a simplified method for performing write file system operations using a layered computing system.

FIG. 6 shows a simple method for performing write file system operations using a layered computing system. A loop is entered beginning at step 600. Execution halts in step 602 pending the receipt of a write request. A determination is then made in step 604 as to whether or not the file reference of the request should be captured to an enabled layer. That determination may be made, for example, by noting the state of the system software is in a capture state, and in some circumstances by noting the PID of the calling application and parents. If no enabled layer is configured for capture, step 606 executes in which the usual write operation is executed using the file reference of the request. Otherwise, a capture layer is identified in step 608. Step 610 then executes, in which a virtual file reference is determined that corresponds to the file reference of the write request. That virtual file reference might be an offset and length for an unused portion of a storage device in some systems, a pathname at a mirrored location in other systems, or other reference. Afterward, the write operation is executed using that virtual file reference in step 612.

The read and write operations spoken of in the discussion of FIGS. 5 and 6 may be performed on some systems through an open( ) call. A read request, for example, might be a call to open( ) with a pathname as a file reference and "r" as an option. Likewise, a write request might be a call to open with "w" or "+" as an option. In either case, a file handle is returned which would correspond either to a true file reference (if the file reference is not managed in a layer) or to a virtual file reference (if the file reference is managed in at least one layer). That file handle will continue to be used in data read and write operations, and thus the data will be delivered to and from the correct system locations. Other systems may use other equivalent methods of opening, reading and writing, and applicable using the methods described herein.

Figure 7:
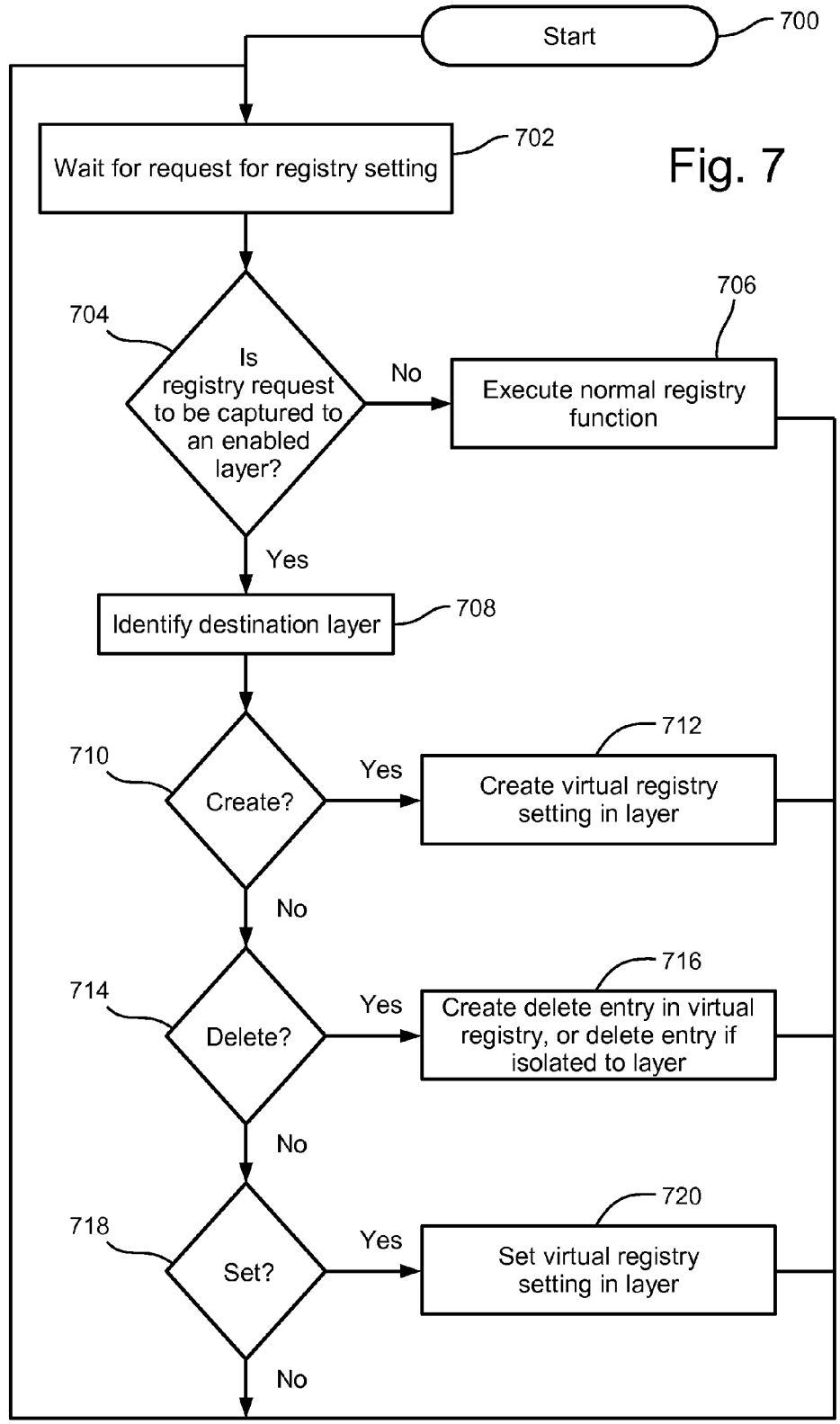
FIG. 7 shows a simplified method for performing registry operations using a layered computing system.

FIG. 7 shows a simple method for performing registry operations using a layered computing system. The method begins at step 700, following which a pause is executed at step 702 until a request for registry setting operation is received. When a registry setting request is received, step 704 executes in which a determination is made as to whether or not the request is to be captured to an enabled layer. If not, step 706 is executed in which a usual registry function is called, as if layering were not present in the system. Otherwise, step 708 is performed, in which a destination layer is identified. Step 710 tests the request for a registry entry creation request. If a creation request was received, step 712 executes in which a virtual registry entry is created in the destination layer. Otherwise step 714 is performed, testing for a registry entry deletion request. If positive, step 716 is executed in which either a virtual registry entry is deleted, if the entry exists in a single layer, or a delete entry is made in the virtual registry of the destination layer signifying that the registry entry should not appear while that layer is enabled. If the request is neither a create or delete request, step 718 is performed testing for a set registry entry request. If positive, step 720 executes creating a virtual setting in the destination layer.

As in the above example, layers may contain file and registry deletion references. Those references may be used where a layer specifies the absence of a file or registry setting, whereby a specified file or registry setting will appear to be absent from the computing system only when the layer is enabled.

The use of a layering system provides several advantages. If applications are stored individually in layers, interactions between application files may no longer occur due to conflicting shared libraries (DLLs), as each application 'sees' only it's own installed libraries first, followed by libraries in the base operating system, those base libraries optionally preceeded by libraries from other layers if desired. Applications captured in a layer may be safely and completely uninstalled by simply removing the layer from the host computing system. Different versions of an application may be stored as layers on a single computer; the user may select a desired version by enabling the particular layer. A layering system may also extend the file systems of the OS beyond physical limits if layers are stored on separate disk partitions or remote file systems. If layering is used for a group of installed applications, the computing system may be restored to a "virgin" or checkpoint state by removing one or a group of application layers. The transfer of applications between similar computing systems can be simplified, in that the transfer may be done simply by moving the layer containing the application. The bundling of an application and user files into a layer provides a package that may be compressed or encrypted and transported conveniently. Using a layering system application vendors can provide 'pre-installed' applications as layers on CD-ROM or other media, those applications being pre-tested and guaranteed to work with a high reliability. A layer also provides a convenient container to limit access to an application, for example for time limited use or license key access.

In preferred systems, the enablement and disablement of layers is performed through a system call. The system drivers control the access of applications to the file system through the enabled layers, generally without requiring significant access to the system disk or other storage. In those systems the installation and de-installation of an application can be as simple as enabling or disabling a containing layer, without requiring the installation or removal of the applications files from a hard disk. In those systems, time consuming snapshot utilities become unnecessary.

In a preferred system, layering only applies to files located to fixed disks and network drives, each layer spanning one or more fixed disks. In those systems removable disks should not generally be layered, as a layer generally pertains to the persistent files and configuration required to operate an application or user environment. It is expected that under most circumstances user files should be permitted to be saved to a floppy disk or CD-RW, for example, so a user can transport his files to another computer. Likewise, areas on a fixed disk may also be reserved for user or other files to be excluded from layering, for example a "my documents" directory, as desired.

In some systems it will be advantageous to distinguish layers into a "read-only" and "read-writable" portions, the read-only portion containing files and configuration as originally installed and the read-writable portion containing additions, deletions and modifications to the original installation. In some circumstances these layers may be referred to as the install portion (read-only) and the user (read-write) section. A read-writable portion may be global to all users of a computer. Alternatively a read-writable portion may be provided for each user of a computer, each read-writable portion being protected from access by other users.

Some systems provide a multi-user environment providing a facility for an administrator to designate layers accessible to individual users and another facility to automatically enable layers on user login and disable layers after a user has logged off. In those systems an administrator may provide layers accessible to all users or some users. Other layers may be provided accessible only to an individual user. In a subset of those systems a writable layer is provided for each user, providing data protection and isolation between users.

A single layer having a read-only and a read-writable portion is equivalent to two layers, one of which is write protected. In alternate systems, read-only and read-writable layer portions are individual peer layers; those layer definitions containing a reference to the accompanying peer layer.

In layered systems layers may be stacked on top of each other, with the real file system at the bottom of the stack. If files of the same name and location exist in multiple layers, or in the base file system, rules can be provided whereby the layered system can determine which file to present to an application. In some systems, layers include dependency information. That dependency information may include a list of layer identifiers which are required to be enabled when a particular layer is enabled. Dependencies may be asserted when a layer is created, by recording the layers enabled on a layered system at the time of layer creation. The layering system software may automatically enable all dependent layers when a particular layer is enabled.

For ease of configuring and managing a layering system, a manager application may be provided. The manager application permits an administrator or user to control the presentation of applications and data on a system, as well as other functions. A manager application may have facilities for importing and exporting layers, using a standard layer archive format. That archive format will advantageously be compressed, and may use standard archiving formats, for example those used by 'zip' or 'tar' type applications. A manager application provides a logical place to contain a facility for changing layered system software settings. A manager application might provide a viewer to view information about a layer. Likewise, a layer editor may be provided to edit certain layer information as desired. An editor might also be provided whereby registry settings and files can be added, removed, or changed in a layer. A facility for selecting, enabling, and disabling layers and layer groups may also be provided. Likewise, a facility for defining and editing layer groups may be included, as well as layer dependency information. A facility for deleting and installing layers may also be provided in that manager application. That application may also include an interface to cause layered system software to enter and exit capture modes.

It may also be desirable to provide a startup layer enablement function, whereby the computing system starts up a group of layers based on layer configuration. This will be especially helpful where it is desired not to provide users with non-layered access to the underlying file system and registry, for example in public settings.

It may optionally be desired to include variable handling with regard to file system paths and registry paths. The location of a file or registry setting specified in a layer may include one or more variables, so as to permit relocation of that object. A variable may be denoted in many ways, for example by surrounding the variable name with percent "%" characters. The source of some variable names and values may be from the environment. For example, Windows operating systems set the "WINDIR" environment variable to the location of the OS system subtree, for example C:\windows. Including the WINDIR variable in a path may permit files of a layer to be moved from one Windows system to another, especially if the OS system subtree resides in different locations on the computers. Other variable values may be supplied at runtime, for example a "CURRENTUSER" variable. In that example, the CURRENTUSER variable is set to a user's login name while that user is logged in. One use of the CURRENTUSER variable is to provide a layered file reference for a global file that appears in each user's profile directory. Yet other variable names and values may be stored in a layer definition. A manager application may provide editing facilities for changing those layer-defined variables, and for editing the pathnames of virtual files.

Layer Creation Modes

Layer creation modes may be provided in a layered system to create new layers through a "capture" operation. A capture operation is generally started and ended, and uses the layering software to intercept operations that install, delete, rename or modify files and configuration such as a registry. If the layering system supports layers having both a readable and read-writable portion, the capture operation may record changes to the readable portion; that readable portion becoming effectively locked when the capture operation is ended. During the capture operation changes made by the installation procedure do not affect the base system, but are rather recorded to the new layer.

A first layer creation mode is simply called "capture" mode. When that mode is enabled, all operations by any application to create, modify or delete files are entered into a layer. This mode is especially helpful in situations where it is desirable to create a new layer for one or more applications to be installed to the computing system. In an example of a capture mode operation on a Windows platform, a user first enables capture mode. The user then executes an application installation program. During the install, all of the applications shared DLLs, registry entries, and .ini files that would be directed to the Windows system directories become trapped in the capture layer. Application files that would be placed on file systems managed by the OS are also redirected into the layer. All of the captured data is held separate from the regular OS either locally or remotely in a data file, hard disk partition, or some other container.

A second layer creation mode is referred to as "capture by PID" mode. That mode is similar to "capture" mode, with the difference being that only changes made by a particular process ID (PID) or one of its child PIDs are captured.

A third layer creation mode is called "delete capture" mode. This mode may be thought of as the inverse of "capture" mode. Delete capture mode is intended to track all of the file system and registry deletions that occur and place those files and registry entries into a new layer. The software (driver) is hooked into the system so that operations that delete, rename, or modify file system or registry so they can be copied to the capture layer before they are modified. This mode may be particularly helpful to create a layer of an already installed application. The user enters "delete capture" mode, following which the user activates the application's deinstallation program. As the application's uninstall program removes files and registry settings, they are copied to the new layer. When the uninstall is complete, the user exists delete capture mode. At that time the application does not exist in the regular file system or registry, but can be activated by the user as it appeared before the uninstall operation by activating the newly created layer.

A fourth layer creation mode is called "delete capture PID" mode. That mode operates in similar fashion to delete capture mode, with the difference that only changes made by a particular PID and child PIDs are tracked, rather than system-wide changes.

A system supporting layering need not implement a capture mode if an alternate layer delivery mechanism is provided, for example a layer import operation or a simple file or file system copy.

Use: Application Installation Generator

Many application installer programs have the ability to create an application install via a "capture" or "snapshot" process. This process typically involves comparing the state of the computer system before and after an application install and generating the install information based on the differences. In a system supporting layers, an application may be captured as outlined above, creating an installation layer. Because changes are tracked as they occur, no state comparison needs to be done, saving time. In addition, it is usually recommended that the "capture" operation be performed on a "clean" or "virgin" system, so the capture process can capture all the necessary system changes (i.e. won't miss changes due to application pieces being left over from prior installations.) This requires the user to reinstall the operating system to get the system into the desired clean state. A layered system may be made clean by disabling all layers created during installation capture procedures (assuming all install operations have occurred under capture operations.) After capture of an installation layer, that layer can be used to install the application at another computer supporting layers, or the information can be extracted from the layer to provide a file manifest for other installation programs.

Use: Software Installation/Uninstallation

Layers can be advantageously used to provide an installation for an application that is relatively easy to uninstall. A software vendor builds an application CD (or other media), first using a capture mode to record a layer of the application installation. That layer is then exported to a file, which file is then combined with an installation program for the layering system software, for example to a compact disc. The compact disc will contain an installation program, which for example might be called 'setup'. The setup program operates first to install the layering system software, and then import the layer exported to the compact disc into the destination system. At that point, the subject application is then installed to the destination system, but isolated in a layer. Because it is isolated, it is protected from corruption from other applications or meddling, and thus it remains in a known and reliable state, potentially reducing the number of technical support calls.

It is probably desirable to include a banner screen advertising the layering system software product and providing contact information for product inquiry and support. It may also be desirable to include a layer manager application with the layering system software to allow a user to enable and disable the application layers or other installed layers, but that is not necessary for a simple demonstration product.

As the application is used, it may be desired to record changes to the virtual file system into the writable portion of a layer. Alternatively, it may be desirable to record some user files to the underlying file system so those files could be retained if the application layer was deinstalled or removed, as might be the case for word processing files, CAD files, etc. The software installer may be given the option to record the software installation of an application layer into a readable-only portion, so the user cannot inadvertently or otherwise damage the application installation.

At some point, it may be desired to remove the application. To do so, the user removes the layer from his computer, which deinstalls the application and any files or changes made to the virtual file system. Uninstalling the layering system software is optional, as the presence of that software would not adversely affect the use of the destination system.

Through that method, software creators may create a demo version of their software. These versions might be used to give the end user experience with a software product before a purchase is made. The advantage of removing changes to the virtual file system is significant, as many applications do not uninstall cleanly and leave residual files and changes.

Optionally, functionality might be built into the layering system software that disables the application layer after a period of time. After such a disabling, a user would have the option of removing the application layer, or purchasing a license for use of the application. The license would presumably be accompanied with a license key or other authentication feature verifiable by the layering system software.

In another alternative configuration, an application layer is never transferred to a resident fixed disk, but rather remains resident on the vendor product, compact disc or otherwise. In that configuration the application layer can only be activated if the vendor product is readable in a media drive, and little or no space is taken on resident file systems for the application installation.

Use: Secure Applications

Applications can be protected from unauthorized access through the use of a layered system. In a first situation, it is desired to protect application files from viewing and copying, for which one solution is described. The layering system software of a suitable system has an additional feature by which a layer may include an authentication key or token. Any application of the computing system desiring to open files within the layer must supply a token to the layering system software before access is allowed. The PID of an authenticating application may be tracked so that only one authentication step is required. The application layer may additionally be encrypted, the layering system software performing decryption and encryption steps at runtime as the application layer is accessed. That system is advantageous in that only the data of a particular application need be encrypted, reducing the complexities of bootstrapping into an encrypted file system and modifying system applications to support encrypted system files.

In that system authenticating applications will have access to the application files, but not applications not having a valid authentication token. The authenticating applications can be constructed such that limited access is permitted to the application files, as desired by the programmer. For example, an application may store a license key to one of the application's files. If access were permitted to that file, an unscrupulous user could copy that license key to a second computer providing illicit access to the application software stored thereon. The authenticating layered system software is installed to the computer, and an application layer is constructed and installed to the computer, that layer encrypted using a key constructed with information specific to the computer, for example a volume label or Ethernet MAC address. A second application installed to the computer, for example Windows Explorer, cannot view the application layer files because it does not possess the correct authentication key. A user is therefore prevented from copying or otherwise accessing the application files, providing security for the software vendor.

In a second situation, it is desirable to protect the software from execution by unauthorized individuals. In that system, the layering system software has a facility for authenticating a user before enabling a layer.

Use: Secure Base OS

In some circumstances it is desirable to regularly restore a computer to a 'virgin' state. This is sometimes done, for example, by Internet cafes and college computer laboratories, or other systems typically used by untrusted users. The computers are regularly reverted back to a known good state to ensure that users have a stable and working system free viruses and from potential interference and security risks. The computer restoration is often performed by writing an image containing all files of the computer to the computer's hard drive made earlier. A layered computing system can serve better.

To use a layered computing system in a first system protection and restoration mode, an administrator first installs a base OS and applications to a computer. The administrator then causes the computer to enter a capture mode, by which all further changes are recorded to a layer and not to the underlying file systems and OS resources. Users may then use the computer in an unrestricted fashion, including installing applications, using the Internet, and even passing (inadvertently) viruses to the computers. At the end of the day (or other period), the administrator ends the capture mode, deletes the layer, and re-enters capture mode. All changes made by users are then wiped and the computer is restored to its base state.

A second system protection and restoration mode provides that user data may be retained between sessions. To use this mode, an administrator first installs a base OS and applications to a computer. The administrator then sets up the computer such that when a user logs in (or otherwise starts a user session), a user layer is enabled. While in a user session, changes are recorded to that user's layer. When the user logs out, the user layer is disabled and retained for future use. That layer may be used repeatedly for multiple user sessions, the state of the user's files and configuration being maintained between sessions. Applications specific to a user might be installed to a user layer providing an easy way to control what applications are available to a particular user.

If desired, a user layer may be stored to a network server and retrieved and stored as required to any computer of a computer farm, so the user may access his files and state anywhere in the computer group. That layer may provide files and directories overlaid on the existing fixed disk file systems, as opposed to locations referencing new network mount points. On a Windows directory structure files located to a layer might appear under C:, as opposed to being presented as a new and separate volume (e.g., D:).

Alternatively, a layer might be configured to store files presented as a virtual volume. For example, a user might store his data in a virtual volume accessible under P:, and backup his user data by backing up the user layer. That layer could also be protected using encryption and authentication by including appropriate facilities in the layered system software. In a variation on that system, a layer might be configured to present files in a subdirectory on an existing volume which could be at any level in a file system hierarchy.

A layering system might also be used to provide a "bottomless" virtual storage device. In that system an auxiliary storage device is presented by layering system software as being available on a main local storage device (e.g. C:). The auxiliary storage device might be an additional local fixed disk, network drive or file system, or other storage resource. The auxiliary storage device space is effectively added to the existing space, providing a way to expand an existing fixed disk that has become filled. The auxiliary storage device may optionally be hidden to the system. This system is advantageous in that no repartitioning is required, no backup and restore option is required, and no uninstall/reinstall operation of applications is required.

Use: Heirarchical Layers

Multiple layers can advantageously be used. In one layer heirarchy, one layer represents a user type and a writable layer contains the user's changes. For example, a company has 500 computers. These computers all have the same base software installed, which may be only the OS. The company then has layers defined for different types of users, for example secretaries, engineers and accountants. The secretarial layer contains word processing, spreadsheet, and other secretarial applications. The engineering layer contains software development tools, CAD tools, and other engineering related applications. The accounting layer includes accounting software. In addition, each user may have a personal layer, which contains an individual's changes on top of the type layer and base system.

If a user causes his computer to fail, an administrator can restore the computer by disabling the user's personal layer. If a computer is to be transferred from engineering to accounting, the administrator removes the engineering type layer and installs the accounting type layer. Using the above exemplified heirarchical layer organization can simplify the administration of a large number of workstations in a company or other organization.

Other Uses

Another use for a layering system is to have layers that represent different environments on a system. For example, a user could have an Office and a Gaming layer, each providing an environment with it's own icons and menus.

In another use, multiple versions of a software product are installed on a computer, each isolated in a layer. A user may enable a particular layer and use the corresponding version of the software product without having to de-install and re-install the application. This use may be especially helpful where an older version of a software product supports a function desired but not supported in a newer version, for example, the importation of older word processing file formats. This use would also be useful to software product testers, who in the course of testing verify software functionality against multiple development versions. In that use the repeated unstalling and reinstalling or cleaning and reinstalling operations are avoided.

Example Implementation

Example systems are provided of an application layering system under a 32-bit Microsoft Windows architecture, such as Windows 95, 98, NT, 2000, and XP. In those system a layering system is formed by adding several files to the stock Windows operating system, those files including a runtime library FSLLIB32.DLL, a compression/archiving library, and an FSLX driver which is either an FSLX.VXD driver (for 95/98/ME based platforms) or an FSLX.SYS driver (for NT based platforms). The addition of those files is performed using an installation program. The example layering system provides a user with the ability to contain third party application installations into a "file system layer" or FSL. The example system provides the modes of "capture", "capture by PID", "delete capture", and "delete capture PID".

Depicted in FIG. 3 are components of the example layering computer system. An operating system 314 is installed to a computing device, that operating system having subsystems for handling a registry 316 and a file system 318. An FSL system driver is installed "on top" of the operating system 314 in order to have first processing priority for registry and file system accesses. An FSL management application 300 provides an administrator an interface to interact with the FSL system driver 312, change its configuration, and make changes to layers. An FSL API library 306 provides a convenient interface for the management application 300 to attach to the FSL system driver 312. At certain times, FSL management application 300 provides notices to the Windows Explorer 302 notifying that application that the contents of a mounted file system have changed. Other applications 304 may interact with the system, performing read and write operations to the file system and registry, through the FSL system driver 304. A compression library 310 may be provided to compress layer information, especially for layer archives exported by the system.

A "lazy thread" is utilized to perform low priority tasks. That thread wakes up occasionally to delete layers that are marked for deletion and write out delete lists that have changed. The execution of the lazy thread may be deferred for a short time if the system is busy.

In the example systems there is a key in the registry under HKEY_LOCAL_MACHINE\SYSTEM called FSLogic\FSL where registry settings describe each layer and its settings. The SYSTEM portion of the registry is used because it is available very early in the boot cycle. Each layer has the properties outlined in the following table:

| Property/Value | Meaning/Function |
| --- | --- |
| Active | Non-zero indicates that the layer is enabled |
| ActiveOnStart | Non-zero indicates the layer should be enabled when the FSLX driver loads. |
| FileRedirect | The path to the location in the file system that contains the file system virtual files. |
| MajorVersion | The major version of the layer format. |
| MinorVersion | The minor version of the layer format. |
| Peer | The name of the peer layer. |
| ReadOnly | Non-zero indicates that the layer is read only, or the readable portion of a peer layer combination. |
| RegRedirect | Path to the location that contains the virtual registry settings for the layer. |
| Type | Layer type. |
| ShouldDelete | Non-zero value indicates that the layer should be deleted. This value is read by the lazy thread to know if the layer should be deleted. |

Also under HKEY_LOCAL_MACHINE\SYSTEM under a key called fslrdr is kept all registry information contained in each layer. Under fslrdr there is further a key for each layer defined in the system. Under each layer key each of the HCC, HCR, HCU, HLM, and HU keys are present. These keys correspond to HKEY_CURRENT_CONFIG, HKEY_CLASSES_ROOT, HKEY_CURRENT_USER, HKEY_LOCAL_MACHINE, and HKEY_USERS respectively. The structure of the registry under these keys mimics the regular structure of the system registry.

When a layer is active, all of the keys and values for the layer are overlaid on the normal registry. For example, a layer "TEST" is defined on a system and has a registry entry "HKEY_LOCAL_MACHINE\SYSTEM\fslrdr\TEST\HLM\Software\XYZCorp". When that layer becomes active, the following key would appear in the registry: "HKEY_LOCAL_MACHINE\Software\XYZCorp".

The FSLX.SYS and its counterpart FSLX.VXD operate to intercept key file system and registry calls and manipulate the results to create the appearance that virtual files and registry settings contained in the layer definitions exist in the real file system and real registry. When requests come that access virtual files or virtual registry settings, these requests are redirected by the FSLX driver to the proper locations in the layer. The FSLX driver also accepts IOCTLs from FSLLIB32.DLL that control the state of the driver. The following table outlines a set of IOCTL commands available through the FSLX driver:

| IOCTL | Description |
| --- | --- |
| Version Query | Returns the driver version. |
| Begin Capture | Causes the driver to enter "Capture" mode. |
| End Capture | Causes the driver to exit "Capture" mode. |
| Begin Delete Capture | Causes the driver to enter "Delete Capture" mode. |
| End Delete Capture | Causes the driver to exit "Delete Capture" mode. |
| Activate Layer | Activates a specified layer. |
| Deactivate Layer | Deactivates a specified layer. |
| Rename Layer | Notifies the driver that a layer has been renamed. |

For each read or write request to a file system or registry, an owner layer is determined. The owner layer is determined by a sequence of steps. First, if the driver is in Capture mode, the owner layer is the layer being captured. Second, if the driver is in PID Capture mode, and if the PID of the requesting process is the PID being captured or a child PID of the PID being captured, the owner layer is the layer being captured. Lastly, if the driver is not in capture mode, and if the PID of the requesting process is a PID of an executable whose executable file is in a layer, the owner layer is the layer where the executable file resides.

Because multiple layers can be active at the same time and those layers may contain entries that overlap, rules are defined to determine the order layers are considered by the driver. Different modes require different search rules. If the system is in capture mode, the owner layer is defined to be the layer specified as the capture layer. Otherwise, the owner layer is defined to be the layer that a particular process started from, as may be determined by traversing upward the PID parent/child chain. For example, suppose layer A contained B.EXE. When B.EXE executes, it results in process C running. The owner layer for process C is then layer A.

When the FSLX driver loads, the following is performed: (1) all mutexes and lists are initialized, (2) a device is created used for API DLL communications, (3) a symbolic link that allows for the device object's access from Win32 programs is made, (4) all of the file system entry points are hooked in, (5) the drives to be redirected (C:, D:, etc.) are hooked in, (6) all of the Registry entry points are hooked in, (7) the lazy thread is started.

The FSLX driver uses the following structures and hooks the following entry points in the file system and Registry system code:

Structures Used:

FSLX_DELETE_ENTRY_REMOVE: Holds information about an entry on a delete list that may be removed later, for which all necessary information will not be available at the time of removal.

FSLXDELETIONCANDIDATE: Holds information about a file that should be later marked as deleted.

PFSLXOPENREGHANDLE: Holds information about all currently open registry handles.

FSLX_PFO_ENTRY: Holds information about an open directory, the information including a pointer to the file object, a handle to the directory, and the directory path.

FSLX_RENAME_ENTRY: Holds information about a rename operation that is used to create a delete entry.

FSLXREGOPENKEY: Holds information about an open key in a layer, including a handle to the key.

SH_RET_ENTRY: Holds the name of a file. These file names may have already been returned in a query routine. This structure is retained to ensure the same name is not returned more than once if the same file exists in multiple redirection areas.

FSLXSHADOWHANDLE: Holds information about an open directory handle. Among other things, it may contain a list of FSLX_PFO_ENTRYs that correspond to directories in applicable layers.

FSLXSHADOWKEY: Holds information about an open registry key. Among other things, it may contain a list of FSLXREGOPENKEY structures that correspond to keys in applicable layers.

File System Calls:

IRP_MJ_CLEANUP: If there is an FSLX_DELETE_ENTRY_REMOVE structure associated with the parameter referenced File Object, free it. If there is an FSLXDELETIONCANDIDATE structure associated with the parameter referenced file object, add a delete entry for the file and free the structure.

IRP_MJ_CLOSE: Free the FSLXSHADOWHANDLE structure associated with the parameter referenced File Object by: (1) removing the shadowHandle from the list, (2) getting a pointer to the shadowhandle using the File Object, (3) decrement the reference count of the shadowHandle, (4) if the reference count is greater than zero, return success, otherwise (5) free the originalPath member of the shadowHandle, (6) for each FSLX_PFO_ENTRY: remove the entry from the list, free the file path, dereference the File Object, close the directory handle, and free the FSLX_PFO_ENTRY structure, (7) for each SH_RET_ENTRY: remove the entry from the list and free the name and structure, (8) free the search string, and (9) free the structure.

IRP_MJ_CREATE: Get the full file name and full parent directory path for the request. Determine if the File Object represents a file or a directory. If the File Object represents a directory, determine if it represents the root directory. Check to see if this is a reentrant call for which the SL_OPEN_TARGET_DIRECTORY bit in currentIrpStack→Flags should be set. If this is a reentrant create, get the shadowHandle object for this File Object, increment the reference count on the shadowHandle if there is one, and return. Determine the owner layer. If the path of the file being opened is in a redirected area, and if the file that is being created is on the delete list, create and fill in an FSLX_DELETE_ENTRY_REMOVE structure and return. The completion routine for that operation checks to see if the create was successful and, if so, removes the delete entry from the delete list. Check to see if the create is for a *.Config or a *.Manifest file. If it is, set a flag, for which at the completion of this routine if the return code is STATUS_OBJECT_PATH_NOT_FOUND the return code is changed to STATUS_OBJECT_NAME_NOT_FOUND. If the request is for a directory, do (1) if a shadowHandle already exists for the parameter referenced File Object, increment it's reference count, (2) if a shadowHandle does not exist, create one with all entries initialized to default values, and for each layer that contains a corresponding directory or delete entries that correspond to the directory, create an FSLX_PFO_ENTRY entry. Determine if the parameter referenced request should be redirected: (1) if the request is a write request and capture mode is enabled, do (a) make sure the parent directory is in the layer being captured, (b) if the parameter referenced request is to a file and if a delete entry exists for the file, create an FSLX_DELETE_ENTRY_REMOVE structure so that the delete entry can be removed if this operation is successful, (c) if the parameter referenced request is to a file and if a delete entry does not exist for the file, use the standard search order to locate and copy any existing file to the writable portion of the layer being captured, and (d) redirect the create to the writable portion of the layer being captured and return; (2) if no layers have the directory and it is an open (not a create), don't redirect and return from the function call; (3) if there is no owner layer, do: (a) if the request is a write request, don't redirect and return from the function call, (b) if the request is a read request, find a first file by iterating through each layer in the search path, and redirect to that file unless the file is on a delete list; (4) if an owner layer can be identified, and if the request is a write request: (a) make sure the directory path exists in the writable section of the owner layer, (b) if the parameter referenced request is to a file, and if a delete entry exists for the file, create an FSLX_DELETE_ENTRY_REMOVE structure so that the delete entry can be removed upon function call completion, (c) if the parameter referenced request is to a file, and if no delete entry exists for the file, use the standard search order to locate and copy any existing file to the writable portion of the layer being captured, and (d) redirect the writable portion of the layer being captured and return; and (5) if an owner layer can be identified, and if the request is a read request, find a first file by iterating through each layer in the search path, and redirect to that file unless the file is on a delete list. If the file that is being opened is on the delete list, return STATUS_OBJECT_NAME_NOT_FOUND. If the open is being performed with the FILE_DELETE_ON_CLOSE flag, and if the parameter referenced file is a file that should be protected from delete, (1) clear the FILE_DELETE_ON_CLOSE flag, and (2) create an FSLXDELETIONCANDIDATE structure, later used in the completion routine to add a delete entry for the file. Return a value that indicates success or failure.

IRP_MJ_CREATE: (completion routine) If the create operation is being canceled, free the shadowHandle if one exists, free any existing FSLXDELETIONCANDIDATE and return. If the create operation failed, free any existing shadowHandle and FSLXDELETIONCANDIDATE and return. If an FSLX_DELETE_ENTRY_REMOVE exists, use it to remove the delete entry from the delete list.

IRP_MJ_DIRECTORY_CONTROL: If the minor function code is IRP_MN_QUERY_DIRECTORY, (1) get the shadowHandle for the File Object, (2) if there is no shadowHandle, return, (3) if the root directory is being enumerated, do not return "." or ".." entries, (4) enumerate the corresponding directories in each layer and the real directory. Use SH_RET_ENTRY structures to make sure duplicate entries are not returned.

IRP_MJ_SET_INFORMATION: If the FileInformationClass is FileDispositionInformation, if the file is being deleted, and if it is a file that should be protected from deletion, create an FSLXDELETIONCANDIDATE structure to be used in the completion routine to add a delete entry for the referenced file. Otherwise, if FileInformationClass is FileRenameInformation, do the following: (1) if the requested operation is a rename operation on a protected file that should succeed, copy the source file to the writable section of the owner layer and create a delete list entry for the source file, (2) if the requested operation is a rename operation on an unprotected file, perform the rename operation and create an FSLX_RENAME_ENTRY entry for the source file.

IRP_MJ_SET_INFORMATION: (completion routine) If FileInformationClass is FileRenameInformation, and if there is an FSLX_RENAME_ENTRY, use the contained information to create a delete entry for the source file of the rename operation. If FileInformationClass is FileDispositionInformation, do: (1) if the operation was successful and the file was deleted, get the FSLXDELETIONCANDIDATE structure, and if the deleted file was not in the writable section of the owner layer, cancel the deletion, (2) if the operation was successful and the delete operation was canceled, remove any existing FSLXDELETIONCANDIDATE, or (3) if the operation was unsuccessful, and if a deletion was being attempted, remove any existing FSLXDELETIONCANDIDATE.

Registry Calls:

RegCloseKey: If this call is re-entrant, pass the call parameters to the OS. Since all NtClose calls come through this hook and not just RegCloseKey calls, make sure that this call is a close for a registry handle. If not, pass the call parameters to the OS. Get the shadowKey structure. If there exists a shadowKey, (1) free the shadowKey and all FSLXREGOPENKEY structures by closing the handle to the key and freeing the structure, and (2) if the main key handle has not been closed, close it. If there is no shadowKey, close the handle. Remove any PFSLXOPENREGHANDLE.

RegCreateKey: If this call is re-entrant, pass the call parameters to the OS. If requesting in a redirected part of the registry, pass the call parameters to the OS. Get the PID of the caller. If there is a delete entry corresponding to the requested create operation, (1) create a new key in the writable section of the owner layer, (2) if unable to create the key, return an error, (3) change the disposition to REG_CREATED_NEW_KEY, (4) create a new shadowKey structure for the created key, (5) determine the owner layer for the key, (6) if there is an owner layer (a) allocate a new FSLXSHADOWKEY structure and initialize with default values and (b) create an FSLXREGOPENKEY entries for applicable layers, (7) if the key does not exist in the base registry, but does in one or more layers, create a user mode handle to be returned to the calling application, and (8) remove the delete entry. Otherwise if there is no delete entry corresponding to the requested create operation, continue. Create a shadowKey structure. Determine the owner layer for the key. If there is an owner layer (1) allocate a new FSLXSHADOWKEY structure and initialize with default values, and (2) create FSLXREGOPENKEY entries for applicable layers. If the key does not exist in the base registry but it does in one or more layers, create a user mode handle to be returned to the calling application. If the key can be opened (not created), set the disposition to REG_OPENED_EXISTING_KEY, create a new PFSLXOPENREGHANDLE and return. If creation of a key in the writable section of an owner layer is successful, do: (1) set the disposition to REG_CREATED_NEW_KEY, (2) create a PFSLXOPENREGHANDLE, and (3) return. If the error code from the creation attempt was STATUS_OBJECT_PATH_NOT_FOUND, return STATUS_OBJECT_PATH_NOT_FOUND. If a key was not created in the writable section of an owner layer, attempt to create the key in the base registry, create a PFSLXOPENREGHANDLE, and return.

RegDeleteKey: If this call is re-entrant, pass the call parameters to the OS. Otherwise, if there is an owner layer, do: (1) if the key has child keys, return STATUS_ACCESS_DENIED, or (2) if the key has no child keys, create a delete entry for the key. If there is no owner layer, do: (1) if there is a shadowKey, delete the key from the base registry and add delete entries to all layers, or (2) if there is no shadowKey, delete the key from the base registry.

RegDeleteValueKey: If this call is re-entrant, pass the call parameters to the OS. Otherwise, if there is an owner layer, create a delete entry for the value. If there is no owner layer, delete the value from the real registry and create delete entries for all applicable layers.

RegEnumerateKey: If this call is re-entrant, pass the call parameters to the OS. Otherwise, if there is a shadowKey, (1) enumerate through the read registry and applicable layers, (2) store state information in the shadowKey. Do not return duplicate entries. If there is no shadowKey, pass the call parameters to the OS.

RegEnumerateValueKey: If this call is re-entrant, pass the call parameters to the OS. Otherwise, if there is a shadowKey, (1) enumerate through the read registry and applicable layers, (2) store state information in the shadowKey. Do not return duplicate entries. If there is no shadowKey, pass the call parameters to the OS.

RegFlushKey: If this call is re-entrant, pass the call parameters to the OS. If there is a shadowKey, flush the real registry key and all applicable layer keys. Otherwise, pass the call parameters to the OS.

RegOpenKey: If this call is re-entrant, or if the key is in the redirection area of the registry, pass the call parameters to the OS. Otherwise, get the caller's PID. If there is a delete entry for this open, return STATUS_OBJECT_NAME_NOT_FOUND. Create a shadowKey. Try to identify an owner layer. If an owner layer can be identified, (1) allocate a new FSLXSHADOWKEY structure initialized with default values, (2)

create FSLXREGOPENKEY entries for applicable layers, and if a key does not exist in the base registry but it does in one or more layers, create a user mode handle to be returned to the calling application. If the open operation was successful, create a PFSLXOPENREGHANDLE.

RegQueryKey: If this call is re-entrant, pass the call parameters to the OS. If there is no shadowKey and the request is of class "KeyNameInformation", get the key name and if it is the name of a redirect key, change it to the base name. If there is a shadowKey and there is a delete entry found for this key, return STATUS_OBJECT_NAME_NOT_FOUND. If there is a shadowKey and there is not a delete entry for this key, query the real registry key and all applicable layer keys. Depending on the class of query, combine the results and return them to the user.

RegQueryValueKey: If this call is re-entrant, or if there is no shadowKey, pass the call parameters to the OS. If there is a delete entry for this value, return STATUS_OBJECT_NAME_NOT_FOUND. Otherwise, if there is a shadow key, use the standard search order to find the value to return.

RegSetValueKey: If this call is re-entrant, or if there is no owner layer, pass the call parameters to the OS. Otherwise, set the value in the writable portion of the owner layer. If the setting operation was successful, remove any delete entry for the value and return.

In the example systems the FSLLIB32.DLL runtime library provides an API that may be used by other applications to manage the layered system and communicate with the FSLX driver, and further provides system management function implementations. That library includes functions to load and unload the FSLX driver, identify version information for itself and FSLX driver; begin and end Capture mode; begin and end Delete Capture mode; import and export layers; create, delete, rename and merge layers; activate and deactivate layers; get layer information; enumerate layers; enumerate the files of a layer; enumerate the registry entries of a layer; manipulate the registry entries of a layer; enable and disable layers; set and unset an "active on start" layer property, create and delete layer groups; enumerate layer groups; add and remove layers from layer groups; verify system integrity; enumerate layer variables; create and delete layer variables; and delete the writable portion of a layer and create a new, empty writable portion. A discussion of the individual exported functions follows with greater specificity, using C language prototypes:

| Function | Description |
| --- | --- |
| FSLActivate(<br>    PTCHAR fslName) | Validates the fslName against defined layers. If corresponding layer or group is defined, get information. If fslName corresponds to a group, recursively call FSLActivate for each layer in the group. Communicates with FSLX driver via an IOCTL to active the layer. Notifies the Windows Explorer that classes may have changed. For each virtual directory contained in the newly activated layer, notify the Windows Explorer that the directory contents have changed. Applications in the layer that are specified to be run on system startup (in win.ini, registry, startup folder, etc.) are started. Return a value indicating success or failure. |
| FSLAddLayerToGroup(<br>    PTCHAR fslName,<br>    PTCHAR groupName) | Verifies that both the specified layer and group are defined. Creates a subkey under the group key with the name of the layer, adding the layer to the group. Return a value indicating success or failure. |
| FSLAddVariable(<br>    PTCHAR fslName,<br>    PTCHAR varName,<br>    PTCHAR varValue) | Verifies the specified layer is defined. Open the variables key for the specified layer. Set a registry value using the provided varName and varValue. Return a value indicating success or failure. |
| FSLCreate(<br>    PTCHAR fslName,<br>    BOOL createPeer) | Verifies the specified layer is not defined. Create a layer definition with default values. Create the layer redirection area in the file system(s). If createPeer is true, recursively call FSLCreate for the peer with createPeer set to FALSE, and set the peer entries in the layers to point to each other. Return a value indicating success or failure. |
| FSLCreateGroup(<br>    PTCHAR groupName) | Validates groupName. If the group already exists, return an error. Create a new group named groupName under the group key HKEY_LOCAL_MACHINE\SYSTEM\FSLogic\groups) Return a value indicating success or failure. |
| FSLDeactivate(<br>    PTCHAR fslName,<br>    BOOL force,<br>    PDWORD pPid) | Validate fslName, and get information about the corresponding layer or group. If fslName corresponds to a group, recursively call FSLDeactivate for each layer of the group. If fslName corresponds to a layer, communicate with the FSLX driver through an IOCTL to deactivate the layer. If the FSLX driver returns an error that there is a PID running from this layer and force is true, kill the PID corresponding to pPid. Return a value indicating success or failure. |
| FSLDelete(<br>    PTCHAR fslName,<br>    BOOL deletePeer,<br>    BOOL force,<br>    PD WORD pPid) | Validates fslName. If the corresponding layer does not exist, or if the corresponding layer has not been deactivated, return an error. If deletePeer is TRUE, recursively call FSLDelete with the name of the peer layer, with deletePeer set to FALSE. Mark the layer as deleted. Remove the fslrdr registry branch for the corresponding layer. Remove the layer from any group entries. Return a value indicating success or failure. |
| FSLDeleteGroup(<br>    PTCHAR groupName) | Validates groupName. Deletes the group key and any subkeys or values. Return a value indicating success or failure. |
| FSLDeletePeer(<br>    PTCHAR fslName,<br>    BOOL force,<br>    PDWORD pPid) | Validates fslName. Finds the peer for fslName. Calls FSLDelete using the found peer name. Return a value indicating success or failure. |
| FSLDeleteVariable( | Validates fslName. Delete any variable/value pair from the layer's |

-continued

| Function | Description |
|---|---|
| PTCHAR fslName, PTCHAR varName) | variables key. Return a value indicating success or failure. |
| FSLEnable( PTCHAR fslName, BOOL bEnable) | Validate fslName, and get information about the corresponding layer or group. If fslName corresponds to a group, recursively call FSLEnable using the same bEnable for each layer of the group. If fslName corresponds to a layer, set the enabled value of the corresponding layer based on bEnable. Return a value indicating success or failure. |
| FSLEndCapture( PTCHAR fslName) | Validate fslName. Communicates with FSLX driver through an IOCTL call to cause the driver to exit capture mode. Notifies Windows Explorer that classes may have changed. For each directory contained in the newly activated layer, Windows Explorer is notified that the directory contents have changed. Return a value indicating success or failure. |
| FSLExport( PTCHAR fslName, PTCHAR archivePath, BOOL replaceIfExists, PTCHAR errorStr, void (__stdcall *RTInfoFunc) (PFSL__IMP__EXP pImpexp), BOOL bInitialCall) | Validate fslName, and get information about the corresponding layer or group. If bInitialCall is TRUE, perform a number of initialization steps including (1) validating the archivePath, (2) testing for the existence of an archive file in the archivePath directory, (3) if the replaceIfExists flag is FALSE, returning an error if an archive file already exists in the archivePath directory, (4) if the replaceIfExists flag is TRUE, deleting an archive file located in the archivePath directory, (5) if fslName corresponds to a layer having a peer layer, recursively calling FSLExport once for both the corresponding layer and the peer layer with bInitialCall set to FALSE, followed by closing the archive file. Otherwise, if fslName corresponds to a layer group, perform a number of steps including (1) for each layer of the group, recursively calling FSLExport for each layer and any existing peer layer to each layer with bInitialCall set to FALSE, (2) storing the group name in the archive, (3) placing a version number in the archive, and (4) closing the archive file. If bInitialCall is FALSE and fslName corresponds to a layer, perform the steps of (1) creating a new archive file if it has not yet been created, (2) opening the archive file, (3) exporting the fslrdr portion of the registry of the layer to a new file, (4) exporting the layer definition in the system registry to a new file, (5) creating a file designating the name of the layer, (6) adding all of the created files in the previous three steps plus the files in the redirection area of the file systems of the layer to the archive, (7) placing a version number in the archive, (8) closing the archive file, and (9) removing the exported registry files and layer name designation file. Return a value indicating success or failure. |
| FSLFindClose( HANDLE hFindFile) | Call FindClose (of the WIN32 API) using hFindFile. Return a value indicating success or failure. |
| FSLFindCloseGroup( PFSL__FIND *groupFind) | Close the registry key in groupFind. Return a value indicating success or failure. |
| FSLFindCloseLayer( PFSL__FIND *fslFind) | Close the registry key in fslFind. Return a value indicating success or failure. |
| FSLFindCloseLayerInGroup( PFSL__FIND *fslFind) | Close the registry key in fslFind. Return a value indicating success or failure. |
| FSLFindCloseVariable( PFSL__FIND *find) | Close the registry key in find. Return a value indicating success or failure. |
| FSLFindFirstFile( LPCTSTR fslName, LPCTSTR lpFileName, LPWIN32__FIND__DATA lpFindFileData) | Validate fslName. Generate a search string including the redirection area of the layer and lpFileName. Call FindFirstFile (WIN32 API) on the redirect search string. Return a value indicating success or failure. |
| FSLFindFirstGroup( PFSL__FIND *groupFind, PTCHAR groupName) | Open the parent key in the registry where all group names are stored (HKEY__LOCAL__MACHINE\SYSTEM\FSLogic\groups). Set the index in groupFind to 0. Find the first group name. Return a value indicating success or failure. |
| FSLFindFirstLayer( PFSL__FIND *fslFind, PTCHAR fslName, BOOL includePeers) | Open HKEY__LOCAL__MACHINE\SYSTEM\FSLogic\fsl. Store the handle to the key in the fslFind structure. Set the index in the fslFind structure to 0. Set includePeers in the fslFind structure to the value of includePeers. Get the first layer name from the registry (layer names are subkeys of HKEY__LOCAL__MACHINE\SYSTEM\FSLogic\FSL). If a layer is marked for deletion, go to the next layer. Skip peer layers if includePeers is FALSE. Return a value indicating success or failure. |
| FSLFindFirstLayerInGroup( PFSL__FIND *fslFind, PTCHAR groupName, PTCHAR fslName) | Open the group registry key under HKEY__LOCAL__MACHINE\SYSTEM\FSLogic\groups. Set the index in fslFind to 0. Get the first layer name from the registry. Return a value indicating success or failure. |
| FSLFindFirstVariable( PFSL__FIND *find, PTCHAR varName) | Open the variables registry key under the layer definition key. Set the index in find to 0. Find the first value (is this a var name or var value?). Return a value indicating success or failure. |
| FSLFindNextFile( HANDLE hFindFile, LPWIN32__FIND__DATA lpFindFileData) | Call FindNextFile (WIN32 API). Return a value indicating success or failure. |
| FSLFindNextGroup( | Increment the index in groupFind. Read the next group name from the |

-continued

| Function | Description |
| --- | --- |
| PFSL_FIND *groupFind,<br>PTCHAR groupName) | registry. Return a value indicating success or failure. |
| FSLFindNextLayer(<br>PFSL_FIND *fslFind,<br>PTCHAR fslName) | Increment the index in the fslFind structure. Read the next layer name from the registry. Skip layers marked for deletion. If the includePeers field in fslFind is FALSE, skip peer layers. Return a value indicating success or failure. |
| FSLFindNextLayerInGroup(<br>PFSL_FIND *fslFind,<br>PTCHAR fslName) | Increment the index in fslFind. Read the next layer name from the group key. Return a value indicating success or failure. |
| FSLFindNextVariable(<br>PFSL_FIND *find,<br>PTCHAR varName) | Increment the index in find. Find the next value (is this a var name or var value?). Return a value indicating success or failure. |
| FSLGetDriverVersion(<br>PDWORD pdMajVersion,<br>PDWORD<br>pdMinVersionstruct) | Communicates to the FSL Driver via an IOCTL call to determine the FSL driver's major and minor version numbers. Sets pdMajVersion and pdMinVersion to the major and minor version numbers of the FSL driver. Return a value indicating success or failure. |
| FSLGetInfo(<br>PTCHAR fslName,<br>PFSL_INFO *pInfo) | Validate the fslName. Set structure pointed to by pInfo to zero. Copy the layer name into the structure. If fslName corresponds to a group, (1) set bIsGroup in pInfo to TRUE, and (2) look at all the layers in the group and set enabled, active, and activeOnStart flags of the pInfo structure appropriately. Read the active, enabled, activeOnStart, majorVersion, minorVersion, type, and peerName values from the registry and set the corresponding flags of the pInfo structure. Return a value indicating success or failure. |
| FSLGetVersion(<br>PDWORD pdMajVersion,<br>PDWORD<br>pdMinVersionstruct) | Sets pdMajVersion and pdMinVersion to the major and minor version numbers of the FSLX driver. Return a value indicating success or failure. |
| FSLGetVariable(<br>PTCHAR fslName,<br>PTCHAR varName,<br>PTCHAR varValue) | Read the value named by varName from the specified layer's variables key into varValue. Return a value indicating success or failure. |
| FSLImport(<br>PTCHAR archivePath,<br>BOOL replaceIfExists,<br>PTCHAR errorStr,<br>void (__stdcall<br>*RTInfoFunc)<br>(PFSL_IMP_EXP pImpexp)) | Verify the archivepath (the archivepath being the full pathname to the file). Open the archive file. Check the version numbers against what is supported by the FSLX driver (i.e. driver version number > archive version number), returning an error if unsupported. Extract the files that contain the layer and group names. Create each group. For each layer to be imported, perform the following: (1) if a layer of the same name already exists and if replaceIfExists is FALSE return an error, otherwise delete the existing layer, (2) extract all pertinent information for the layer from the archive, (3) delete the file that indicates the layer name, (4) import the registry fslrdr branch for the layer, (5) import the layer definition, (5) mark the layer as enabled, and (6) delete the layer registry information files. Close the archive. Return a value indicating success or failure. |
| FSLInitSystem(void) | Verify the FSL system: (1) make sure HKEY_LOCAL_MACHINE\SYSTEM\FSLogic\FSL exists, (2) make sure major and minor version registry value are created, (3) make sure default file system redirection path and registry redirection path registry values are set, (4) make sure HKEY_LOCAL_MACHINE\SYSTEM\fslrdr exists, and (5) make sure C:\fslrdr exists. Read default file system redirection path. Read default registry redirection path. Return a value indicating success or failure. |
| FSLIsGroup(PTCHAR name) | Validate the name. Determine if name is a valid group by attempting to open the group key under HKEY_LOCAL_MACHINE\SYSTEM\FSLogic\groups. Return a value indicating success or failure. |
| FSLLoadDriver(void) | Verify the FSL system: (1) make sure HKEY_LOCAL_MACHINE\SYSTEM\FSLogic\FSL exists, (2) make sure major and minor version registry value are created, (3) make sure default file system redirection path and registry redirection path registry values are set, (4) make sure HKEY_LOCAL_MACHINE\SYSTEM\fslrdr exists, and (5) make sure C:\fslrdr exists. Loads the driver if it is not loaded. Notifies Windows Explorer via SHChangeNotify that the C:\fslrdr directory has changed. Return a value indicating success or failure. |
| FSLRegCloseKey(HKEY hKey) | Close the registry key. Return a value indicating success or failure. |
| FSLRegCopyKey(<br>HKEY srcKey,<br>PTCHAR srcKeyName,<br>HKEY destParentKey,<br>BOOL overwrite,<br>BOOL removeAfterCopy) | Create a new key name under the destination parent key. If the key already existed under the destination parent and overwrite is FALSE, and if copying the values and subkeys from the source would overwrite any values or subkeys in the destination return FALSE. Otherwise, copy the subkeys and values to the destination. If removeAfterCopy is TRUE, delete the registry source key with all of its subkeys and values. Return a value indicating success or failure. |
| FSLRegCopyValue(<br>HKEY srcKey,<br>LPCTSTR lpValueName, | If the value already exists under destKey and overwrite is false, return an error. Read the source value and write that value to the destination. If removeAfterCopy is TRUE, remove the source value (what about the |

-continued

| Function | Description |
| --- | --- |
| HKEY destKey,<br>BOOL overwrite,<br>BOOL removeAfterCopy) | source key?) Return a value indicating success or failure. |
| FSLRegCreateKeyEx(<br>HKEY hKey,<br>LPCTSTR lpSubKey,<br>DWORD Reserved,<br>LPTSTR lpClass,<br>DWORD dwOptions,<br>REGSAM samDesired,<br>LPSECURITY_AT-<br>TRIBUTES<br>lpSecurity Attributes,<br>PHKEY phkResult,<br>LPDWORD lpdwDisposition) | Create a registry path to the layer's redirection area using the layer's redirect path, its name, and lpSubKey. Create the key in the redirection area. Return a value indicating success or failure. |
| FSLRegDeleteKey(<br>HKEY hKey,<br>LPCTSTR lpSubKey) | Remove the key and all subkeys and values. Return a value indicating success or failure. |
| FSLRegDeleteValue(<br>HKEY hKey,<br>LPCTSTR lpValueName) | Delete the specified value. Return a value indicating success or failure. |
| FSLRegEnumKeyEx(<br>HKEY hKey,<br>DWORD dwIndex,<br>LPTSTR lpName,<br>LPDWORD lpcbName,<br>LPDWORD lpReserved,<br>LPTSTR lpClass,<br>LPDWORD lpcbClass,<br>PFILETIME<br>lpftLastWriteTime) | Enumerate the specified key. Return a value indicating success or failure. |
| FSLRegEnumValue(<br>HKEY hKey,<br>DWORD dwIndex,<br>LPTSTR lpValueName,<br>LPDWORD lpcbValueName,<br>LPDWORD lpReserved,<br>LPDWORD lpType,<br>LPBYTE lpData,<br>LPDWORD lpcbData) | Enumerate the specified value. Return a value indicating success or failure. |
| FSLRegOpenKeyEx(<br>PTCHAR fslName,<br>HKEY hKey,<br>LPCTSTR lpSubKey,<br>DWORD ulOptions,<br>REGSAM samDesired,<br>PHKEY phkResult) | Create a registry path to the layer's redirect area using the layer's redirect path, its name, and lpSubKey. Open the key in the redirection area. Return a value indicating success or failure. |
| FSLRegQueryValueEx(<br>HKEY hKey,<br>LPTSTR lpValueName,<br>LPDWORD lpReserved,<br>LPDWORD lpType,<br>LPBYTE lpData,<br>LPDWORD lpcbData) | Query the value specified. Return a value indicating success or failure. |
| FSLRegSetValueEx(<br>HKEY hKey,<br>LPCTSTR lpValueName,<br>DWORD Reserved,<br>DWORD dwType,<br>CONST BYTE *lpData,<br>DWORD cbData) | Set the specified value. Return a value indicating success or failure. |
| FSLRemoveLayerFromGroup(<br>PTCHAR fslName,<br>PTCHAR group) | Verify that the group exists, and that the layer is a member of the group. Remove the layer from the group by deleting the key with the layer's name from the group key. Return a value indicating success or failure. |
| FSLResetPeer(<br>PTCHAR fslName,<br>BOOL force,<br>PDWORD pPid) | Get the peer name for this layer (writable section of the layer). Get information about the peer. make sure the peer is deactivated. Delete the peer. Create the peer. Point the layer and the new peer layer at each other by setting their peer values in the registry. If the named layer is active, activate the new peer layer. Return a value indicating success or failure. |
| FSLSetActiveOnStart(<br>PTCHAR name,<br>BOOL bActiveOnStart) | Verify the name corresponds to an existing layer or group. Get information about the named layer or group. If the name corresponds to a group, recursively call FSLSetActiveOnStart for each layer in the group. Otherwise, set the activeOnStart value for the layer to bActiveOnStart. Return a value indicating success or failure. |

-continued

| Function | Description |
|---|---|
| FSLSetLayerInfo(<br>PTCHAR name<br>PTCHAR fileRedirect,<br>PTCHAR regRedirect,<br>DWORD *pType,<br>DWORD *pReadOnly,<br>PTCHAR peerName) | Verify that the name corresponds to a layer. Open the registry key that contains the layer definition. If fileRedirect is specified, set the value of the proper registry value. If regRedirect is specified do: (1) set the value of the proper registry value, (2) create the specified redirect path, (3) create the redirect root keys (HLM, HCU, HU, HCC, and HCR). If type is specified, set the value of the proper registry value. If readOnly is specified, set the value of the proper registry value. If peerName is specified, set the value of the proper registry value. Return a value indicating success or failure. |
| FSLStartCapture(<br>PTCHAR fslName,<br>BOOL bTrack,<br>DWORD dPid) | Validates fslName to make sure it is a valid layer name (legal characters, etc.) Communicates to the FSL Driver via an IOCTL to put it into Capture mode. Notifies Windows Explorer that classes may have changed. For each directory contained in the newly activated layer, Windows Explorer is notified that the directory contents have changes. Applications in the layer that are specified to be run on system startup are started (there are several places where these can be specified: win.ini, registry, startup folder, etc.) Return a value indicating success or failure. |
| FSLUnloadDriver(BOOL force) | All active layers are deactivated. Unloads the FSLX driver. Notifies Windows Explorer via SHChangeNotify that the C:\fslrdr directory has changed. Return a value indicating success or failure. |
| FSLVerifyBaseSystem(void) | Make sure HKEY_LOCAL_MACHINE\SYSTEM\FSLogic exists. Put the current major and minor version into majorVersion and minorVersion values. Put the default File System redirection path in a DefaultFileRedirect value. Put the default Registry redirection path in a DefaultRegistryRedirect value. Make sure HKEY_LOCAL_MACHINE\SYSTEM\fslrdr exists. Make sure fslrdr exists at the root of all file systems that will be redirected. Return a value indicating success or failure. |

Each of the above functions returns a value of the type "FSLLIB32_API DWORD_stdcall" indicating success or failure. In the above functions, the TCHAR variable type changes depending on the compilation options. It compiled for Unicode, a TCHAR is a 16 bit entity, otherwise it is an 8 byte char. A BOOL may be represented by a single bit, but is often defined to be a word so as to permit efficient word alignment according to the processor architecture. A DWORD is normally a 32-bit integer. And an LPCTSTR is a long pointer to a constant array of TCHARs.

In the example systems, on each file system volume (C:, D:, etc.) included in the system there is an fslrdr directory at the root of the volume. This directory contains file system information for each of the defined layers. Under the fslrdr directory directories that correspond to each layer are maintained. Under each of those layer directories is a directory that represents the drive letter. Under each of those letter directories the contained directories and file structures mimic the regular structure of the containing drive. When a layer is active all of the directories and files defined for the layer are overlaid on the normal file system. For example, the directory "C:\fslrdr\TEST\c\XYZCorp" is defined under a "TEST" layer. When the "TEST" layer is active, the directory "c:\XYZCorp" appears on the C: drive to all applications running under that layer, and optionally under other layers depending on the implementation details.

While the present systems and methods have been described and illustrated in conjunction with a number of specific configurations, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed is:

1. A layered computing system for isolating files from a base operating system, capable of storing a user file to a non-layered location, comprising:

a processor;

a storage device group accessible by said processor, said storage group operable to contain system files, at least one application, and a plurality of layers configured to be selectively activated as enabled layers or deactivated as disabled layers;

instructions stored to said storage device group, said instructions being further executable by said processor to achieve functions of:

receiving from said application a write request for a write operation to a file system, said write request containing a file reference appropriate to a file system organization;

determining whether at least one of the enabled layers is configured for capture;

determining whether said write request is related to said user file;

if said write request is either determined to relate to said user file or none of the enabled layers are configured for capture, causing said write operation to execute using said file reference of said write request;

if at least one of the enabled layers is configured for capture and said write request is determined not to relate to said user file, identifying one of the enabled layers as a capture layer;

following the identifying of said capture layer, creating a virtual write reference corresponding to said file reference of said write request relative to said capture layer;

following the creating of said virtual write reference, causing said write operation to execute using said virtual write reference.

2. A layered computing system according to claim 1, wherein in the execution of said instructions the determination of whether said file reference relates to said user file is made with respect to whether said file reference is within a preselected location.

3. A layered computing system according to claim 2, wherein in the execution of said instructions the determination of whether said file reference relates to said user file is made with respect to whether said file reference is to a removable drive.

4. A layered computing system according to claim 2, wherein in the execution of said instructions the determination of whether said file reference relates to said user file is made with respect to whether said file reference is to a preselected directory.

5. A layered computing system according to claim 1, wherein said instructions are further executable to achieve the functions of:
receiving from said application a read request for a read operation to said file system, said read request containing a file reference appropriate to said file system organization;
for said read request, determining whether said file reference is maintained in at least one of said enabled layers;
if said read request containing said file reference is found not to be maintained in at least one of said enabled layers, then causing a read operation to execute using said file reference of said read request;
if said read request containing said file reference is found to be maintained in at least one of said enabled layers, then identifying an owner layer having priority over said enabled layers;
following the identifying of said owner layer for said read request, identifying a virtual read reference in said owner layer;
following the identifying of said virtual read reference, causing said read operation to execute using said virtual read reference.

6. A layered computing system according to claim 1, wherein said instructions are further executable to achieve the function of copying an existing file from said base operating system to one of said plurality of layers prior to causing said write operation to execute if said write operation is a modify operation to said existing file.

7. A layered computing system according to claim 1, wherein said instructions are further executable to achieve the functions of:
receiving from said application a registry request to create, delete, or set a value of a registry setting;
following receipt of said registry request, determining whether a registry operation of said registry request is to be captured to one of said enabled layers;
if said registry request is a request to create said registry setting, then upon a determination that said registry setting is not to be captured to one of said enabled layers, causing a registry setting creation operation to execute in a registry location for said base operating system;
if said registry request is a request to create said registry setting, then upon a determination that said registry setting is to be captured to one of said enabled layers, identifying a registry creation destination layer;
following said identifying of said registry creation destination layer, causing said registry setting to be created virtually in said registry creation destination layer;
if said registry request is a request to delete said registry setting, then upon a determination that said registry setting is not to be captured to one of said enabled layers, causing a registry setting deletion operation to execute in said registry location for said base operating system;
if said registry request is a request to delete said registry setting, then upon a determination that said registry setting is to be captured to one of said enabled layers, identifying a registry deletion destination layer;
following said identifying of said registry deletion destination layer, causing said registry setting to be deleted virtually in said registry deletion destination layer;
if said registry request is a request to set said registry setting, then upon a determination that said registry setting is not to be captured to one of said enabled layers, causing a registry setting operation to execute in said registry location for said base operating system;
if said registry request is a request to set said registry setting, then upon a determination that said registry setting is to be captured to one of said enabled layers, identifying a registry setting destination layer; and
following said identifying said registry setting destination layer, causing said registry setting to be created virtually in said registry setting destination layer.

8. A set of computer readable media containing computer instructions for operating a layered computing environment permissive of a user file being written to a non-layered location, the set of computer readable media comprising at least one medium upon which is stored the computer instructions executable by a computing system to achieve functions of:
receiving from an application a write request for a write operation to a file system, said write request containing a file reference appropriate to a file system organization;
determining whether at least one of the enabled layers is configured for capture;
determining whether said write request is related to said user file;
if said write request is either determined to relate to said user file or none of the enabled layers are configured for capture, causing said write operation to execute using said file reference of said write request;
if at least one of the enabled layers is configured for capture and said write request is determined not to relate to said user file, identifying one of the enabled layers as a capture layer;
following the identifying of said capture layer, creating a virtual write reference corresponding to said file reference of said write request relative to said capture layer;
following the creating of said virtual write reference, causing said write operation to execute using said virtual write reference.

9. A set of computer readable media according to claim 8, wherein the determination of whether said file reference relates to said user file is made with respect to whether said file reference is within a preselected location.

10. A set of computer readable media according to claim 9, wherein the determination of whether said file reference relates to said user file is made with respect to whether said file reference is to a removable drive.

11. A set of computer readable media according to claim 9, wherein the determination of whether said file reference relates to said user file is made with respect to whether said file reference is to a preselected directory.

12. A set of computer readable media according to claim 8, wherein said computer instructions are further executable to achieve the functions of:

receiving from said application a read request for a read operation to said file system, said read request containing a file reference appropriate to said file system organization;

for said read request, determining whether said file reference is maintained in at least one of said enabled layers;

if said read request containing said file reference is found not to be maintained in at least one of said enabled layers, then causing a read operation to execute using said file reference of said read request;

if said read request containing said file reference is found to be maintained in at least one of said enabled layers, then identifying an owner layer having priority over said enabled layers;

following the identifying of said owner layer for said read request, identifying a virtual read reference in said owner layer;

following the identifying of said virtual read reference, causing said read operation to execute using said virtual read reference.

13. A set of computer readable media according to claim 8, wherein said computer instructions are further executable to achieve the function of copying an existing file a base operating system to one of said enabled layers prior to causing said write operation to execute if said write operation is a modify operation to said existing file.

14. A set of computer readable media according to claim 8, wherein said computer instructions are further executable to achieve the functions of:

receiving from said application a registry request to create, delete, or set a value of a registry setting;

following receipt of said registry request, determining whether a registry operation of said registry request is to be captured to one of said enabled layers;

if said registry request is a request to create said registry setting, then upon a determination that said registry setting is not to be captured to one of said enabled layers, causing a registry setting creation operation to execute in a registry location for a base operating system;

if said registry request is a request to create said registry setting, then upon a determination that said registry setting is to be captured to one of said enabled layers, identifying a registry creation destination layer;

following said identifying of said registry creation destination layer, causing said registry setting to be created virtually in said registry creation destination layer;

if said registry request is a request to delete said registry setting, then upon a determination that said registry setting is not to be captured to one of said enabled layers, causing a registry setting deletion operation to execute in said registry location for said base operating system;

if said registry request is a request to delete said registry, then upon a determination that said registry setting is to be captured to one of said enabled layers, identifying a registry deletion destination layer;

following said identifying of said registry deletion destination layer, causing said registry setting to be deleted virtually in said registry deletion destination layer;

if said registry request is a request to set said registry setting, then upon a determination that said registry setting is not to be captured to one of said enabled layers, causing a registry setting operation to execute in said registry location for said base operating system;

if said registry request is a request to set said registry setting, then upon a determination that said registry setting is to be captured to one of said enabled layers, identifying a registry setting destination layer; and following said identifying said registry setting destination layer, causing said registry setting to be created virtually in said registry setting destination layer.

15. A method of writing files in a layered computing environment permissive of a user file being written to a non-layered location, comprising the steps of:

receiving from an application a write request for a write operation to a file system, said write request containing a file reference appropriate to a file system organization;

determining whether said write request is related to said user file;

determining whether at least one of the enabled layers is configured for capture;

if said write request is either determined to relate to said user file or none of the enabled layers are configured for capture, causing said write operation to execute using said file reference of said write request;

if at least one of the enabled layers is configured for capture and said write request is determined not to relate to said user file, identifying one of the enabled layers as a capture layer;

following the identifying of said capture layer, creating a virtual write reference corresponding to said file reference of said write request relative to said capture layer;

following the creating of said virtual write reference, causing said write operation to execute using said virtual write reference.

16. A method according to claim 15, wherein the determination of whether said file reference relates to said user file is made with respect to whether said file reference is within a preselected location.

17. A method according to claim 15, wherein the determination of whether said file reference relates to said user file is made with respect to whether said file reference is to a removable drive.

18. A method according to claim 15, wherein the determination of whether said file reference relates to said user file is made with respect to whether said file reference is to a preselected directory.

* * * * *